United States Patent
King et al.

(10) Patent No.: US 7,333,119 B1
(45) Date of Patent: Feb. 19, 2008

(54) SYSTEM AND METHOD FOR VIRTUAL COVERAGE ANTI-ALIASING

(75) Inventors: Gary C. King, San Jose, CA (US); Douglas Sim Dietrich, Jr., Los Gatos, CA (US); Michael J. M. Toksvig, Palo Alto, CA (US); Steven E. Molnar, Chapel Hill, NC (US); Edward A. Hutchins, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 298 days.

(21) Appl. No.: 10/980,078

(22) Filed: Nov. 2, 2004

(51) Int. Cl.
*G09G 5/00* (2006.01)

(52) U.S. Cl. ............... 345/611; 345/428; 345/606; 345/612; 345/613; 345/614; 345/619; 345/639; 382/260; 382/268; 382/269; 382/271; 382/275; 382/299

(58) Field of Classification Search ........ 345/612–614, 345/639; 382/271
See application file for complete search history.

(56) References Cited

U.S. PATENT DOCUMENTS

| | | | |
|---|---|---|---|
| 5,818,456 A | * | 10/1998 | Cosman et al. ............ 345/614 |
| 6,452,595 B1 | | 9/2002 | Montrym |
| 6,469,707 B1 | | 10/2002 | Voorhies |
| 6,720,975 B1 | | 4/2004 | Dietrich |
| 6,768,491 B2 | * | 7/2004 | Lefebvre et al. ............ 345/581 |
| 6,989,835 B2 | * | 1/2006 | Deering et al. ............ 345/502 |
| 6,999,100 B1 | * | 2/2006 | Leather et al. ............. 345/611 |
| 7,123,277 B2 | * | 10/2006 | Brown Elliott et al. ..... 345/690 |

OTHER PUBLICATIONS

"Computer Graphics: Principles and Practice; 2nd edition in C," Foley, van Dam, Feiner, Hughes. (c) 1996 Addison-Wesley Publishing Co., Inc., pp. 132-137.*

* cited by examiner

*Primary Examiner*—Kee M. Tung
*Assistant Examiner*—Antonio A Caschera
(74) *Attorney, Agent, or Firm*—Cooley Godward Kronish LLP

(57) ABSTRACT

A graphics system has a mode of operation in which real samples and virtual samples are generated for anti-aliasing pixels. Each virtual sample identifies a set of real samples associated with a common primitive that covers a virtual sample location within a pixel. The virtual samples provide additional coverage information that may be used to adjust the weights of real samples.

14 Claims, 11 Drawing Sheets

SYSTEM AND METHOD FOR VIRTUAL COVERAGE ANTI-ALIASING

FIELD OF THE INVENTION

The present invention is generally related to anti-aliasing of graphics applications. More particularly, the present invention is directed towards reducing the storage, bandwidth, and computational requirements for achieving high quality anti-aliasing that conventionally requires a substantial number of samples per pixel.

BACKGROUND OF THE INVENTION

Computer graphics systems represent graphical primitives as pixel elements of a display. Aliasing refers to the visual artifacts, such as stair-stepping of surface edges (sometimes known as "jaggies"), that occur when an image is sampled at a spatial sample frequency that is too low.

A variety of anti-aliasing techniques exist to reduce visual artifacts. One example is supersampling, in which an image is sampled more than once per pixel grid cell and the samples are filtered. For example, in supersampling the contribution of each sample in a pixel may be weighted to determine attributes of the pixel, such as the pixel color. Another example of an anti-aliasing technique is multisampling. As objects are rendered in a multisampling system, a single color is typically computed per primitive and used for all subpixel samples covered by the primitive. Additional background information on anti-aliasing techniques used in graphics processing units (GPUs) may be found in several patents issued to the Nvidia Corporation of Santa Clara, Calif. such as U.S. Pat. No. 6,452,595, "Integrated graphics processing unit with anti-aliasing," U.S. Pat. No. 6,720,975, "Super-sampling and multi-sampling system and method for anti-aliasing," and U.S. Pat. No. 6,469,707, "Method for efficiently rendering color information for a pixel in a computer system," the contents of each of which are hereby incorporated by reference.

In both supersampling and multisampling the quality of the anti-aliasing tends to improve as the number of samples per partially covered pixel increases. For example, increasing the number of samples per pixel from four samples ("4x" sampling) to sixteen ("16x" sampling) would be expected to reduce visual artifacts. However, as the number of samples per pixel increases more sample data must be generated, stored, transported, and processed. Consequently, the required memory resources, computing resources, and memory bandwidth may increase as the number of samples per pixel is increased. As a result, the cost and complexity of a graphics system tends to increase as the number of samples used for anti-aliasing increases.

Therefore, what is desired is an improved apparatus, system, and method for anti-aliasing that achieves many of the same benefits associated with an increase in the number of samples per pixel but without the corresponding increase in cost and complexity associated with conventional anti-aliasing techniques.

SUMMARY OF THE INVENTION

A graphics system has a mode of operation in which it determines coverage of primitives at virtual sample locations and real sample locations within a pixel. Information on virtual sample coverage is used to adjust the weights of real samples for a down-filtering process. In one embodiment, a real sample has color component data whereas a virtual sample has no color component data.

In one embodiment, weighted samples for anti-aliasing a pixel are generated by determining coverage of primitives over virtual sample locations and real sample locations and utilizing virtual sample coverage information to adjust the weights of real samples.

One embodiment of a method of generating weighted samples for anti-aliasing pixels includes: generating a sequence of graphical primitives for a scene; detecting coverage of at least one virtual sample location by the primitives; for each covered virtual sample location, forming a virtual sample by identifying a set of real samples that are also covered by a common visible primitive; and utilizing the at least one virtual sample to adjust the weight of at least one real sample.

One embodiment of a method of generating weighted samples for anti-aliasing a pixel includes: determining coverage of a sequence of primitives generated for a scene on real sample locations and virtual sample locations; for each real sample location, generating a real sample having at least color component information; for each virtual sample location, identifying a set of real samples which are covered by a common primitive; and utilizing coverage information for at least one of the virtual sample locations to adjust the weight of at least one of the real samples.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention generally comprises an apparatus, system, and method for utilizing both real samples and virtual samples for anti-aliasing (AA) graphical primitives, such as polygons and lines. An exemplary application of virtual sample module 160 is in a multisampling system, although it will be understood throughout the following discussion that virtual samples of the present invention may be utilized in other types of anti-aliasing systems, such as supersampling systems.

Figure 1:
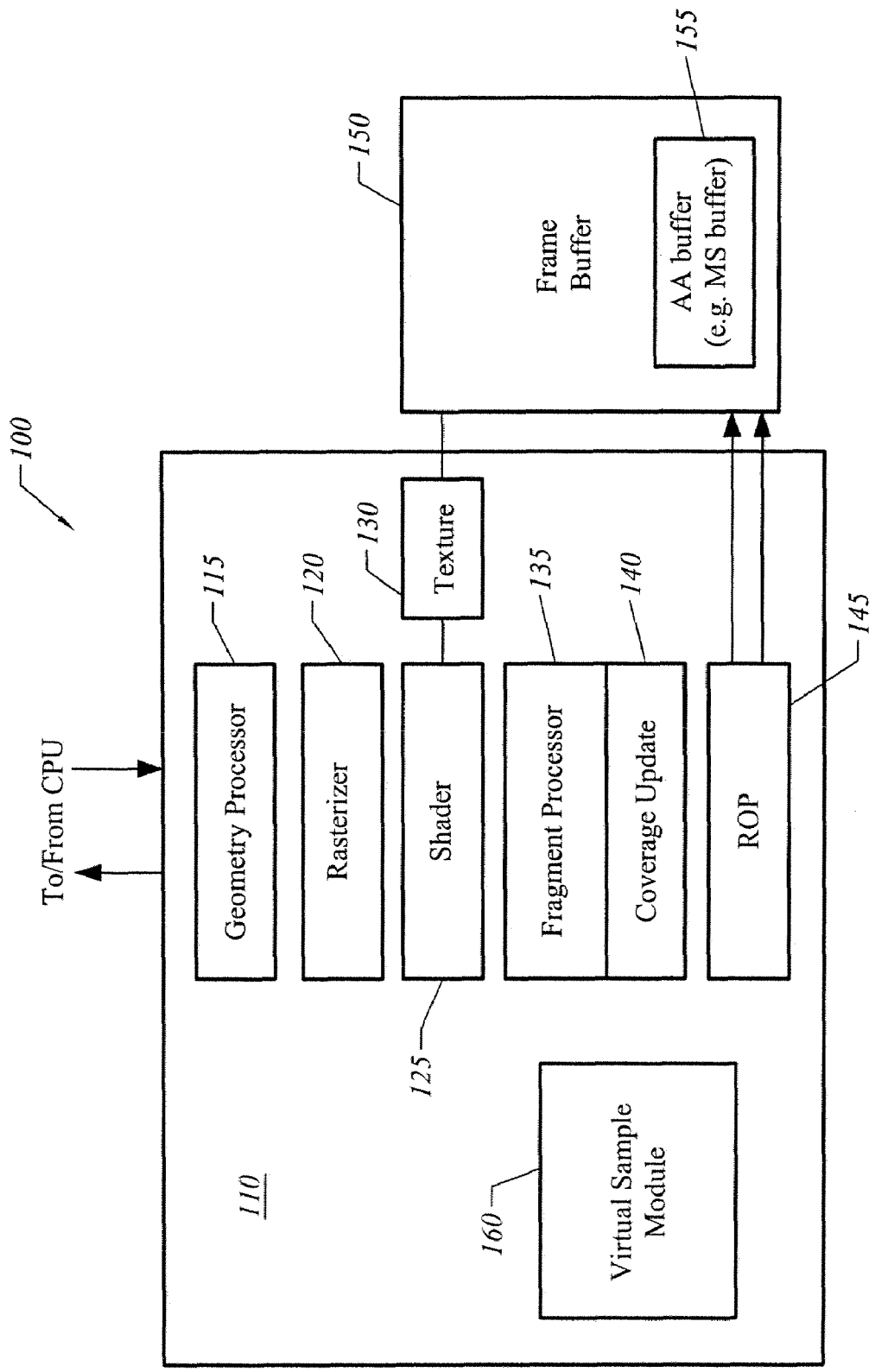
FIG. 1 is a block diagram of a graphics system in accordance with one embodiment of the present invention.

FIG. 1 illustrates an exemplary graphics system 100 in accordance with one embodiment of the present invention. A graphics processing pipeline 110 receives commands for generating graphical images from a central processing unit (CPU) (not shown). Graphics processing pipeline 110 may be disposed on a GPU chip and includes, for example, a geometry processor 115 for generating primitives from vertex data, a rasterizer 120 for rasterizing primitives, a shader unit 125 and a texture unit 130 for applying textures, a fragment processor 135 for processing fragments, and a raster operations (ROP) unit 145 for performing frame buffer operations with a frame buffer 150, such as frame buffer blending, anti-aliasing, and discarding occluded primitives. Frame buffer 150 may include an anti-aliasing (AA) buffer 155, such as a multi-sample (MS) buffer in a multisampling embodiment, for storing real samples.

In one embodiment, graphics system 100 includes a coverage update module 140 to calculate the fractional coverage of primitives across partially covered pixels for virtual sample locations. In one embodiment coverage update module 140 utilizes a comparatively low precision test to determine which real and virtual samples are covered on individual pixels in order to reduce the bandwidth of information required from the rasterizer 120. In one embodiment, a virtual sample module 160 generates virtual samples that provide information on the coverage of primitives across pixels. For a particular pixel, virtual samples are updated in response to a change in the coverage of primitives across the pixel. The virtual samples that are generated may be stored in one or more locations, such as in a frame buffer, color buffer, z buffer, or other memory location. Coverage update module 140 and virtual sample module 160 are illustrated at a particular location within graphics pipeline 110, although it will be understood that that they may be located in other locations, such as in ROP 145.

Virtual sample module 160 may, in some embodiments, be configured to generate and utilize virtual samples in anti-aliasing calculations for specific operational conditions. In some embodiments, virtual samples are utilized for anti-aliasing calculations only for edge pixels (i.e., only for partially covered pixels). In some embodiments, coverage updates used to generate virtual samples are disabled if a z depth test operation is disabled, a z depth write operation is disabled, or alpha blending is enabled. In some embodiments, an Application Programming Interface (API) provides commands for enabling, disabling, and configuring the use of virtual samples to update coverage information during execution of a graphics program by the CPU (not shown). In one embodiment, heuristics are used to determine when coverage should be updated using virtual samples. For example, the heuristics may be chosen so that rendering modes that correspond to scene geometry get high-quality coverage information using virtual samples, but rendering which corresponds to special effects or lighting (e.g., particles or multi-pass geometry) do not.

When a new primitive crosses one or more real samples, changes to the status of virtual samples are updated. Any virtual sample locations that are covered by the primitive are updated. Additionally, the status of virtual samples that used to refer to the covered real samples, but which are now not covered, are updated. In one embodiment a virtual sample is a pointer that maps a correspondence of a virtual sample location within a pixel to the set of real samples that are covered by a visible (e.g., currently the topmost with respect to an eyepoint) primitive that also covers the virtual sample location. A virtual sample is "owned" by a real sample if it is determined that a visible (topmost) primitive covers both the real sample and the virtual sample. A virtual sample is assumed to have the same color component value as the real samples that own it, since they are all covered by the same primitive. For example, if a real sample of a primitive has a green color, then a virtual sample covered by the same primitive can be assumed to have the same green color. Table 1 illustrates an exemplary mapping for three virtual sample locations within a pixel.

TABLE 1

Table of Exemplary Virtual Sample Data.

| | |
|---|---|
| Virtual Sample Location No. 1 | Set Of Real Samples That Are Covered By The Same Visible Primitive That Covers Virtual Sample Location No. 1 |
| Virtual Sample Location No. 2 | Set Of Real Samples That Are Covered By The Same Visible Primitive That Covers Virtual Sample Location No. 2 |
| Virtual Sample Location No. 3 | Set Of Real Samples That Are Covered By The Same Visible Primitive That Covers Virtual Sample Location No. 3 |

Figure 2:
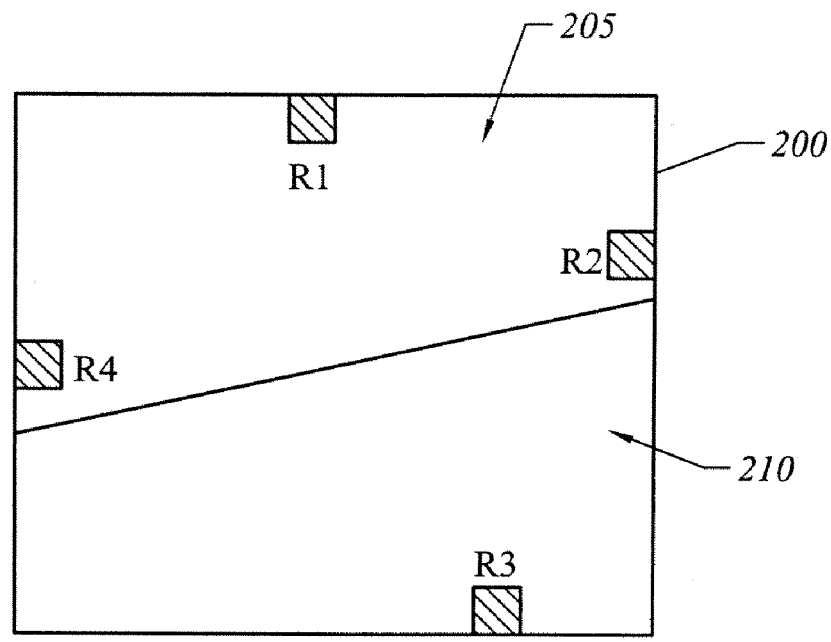
FIG. 2 illustrates coverage of a primitive over a real sample.
Figure 3:
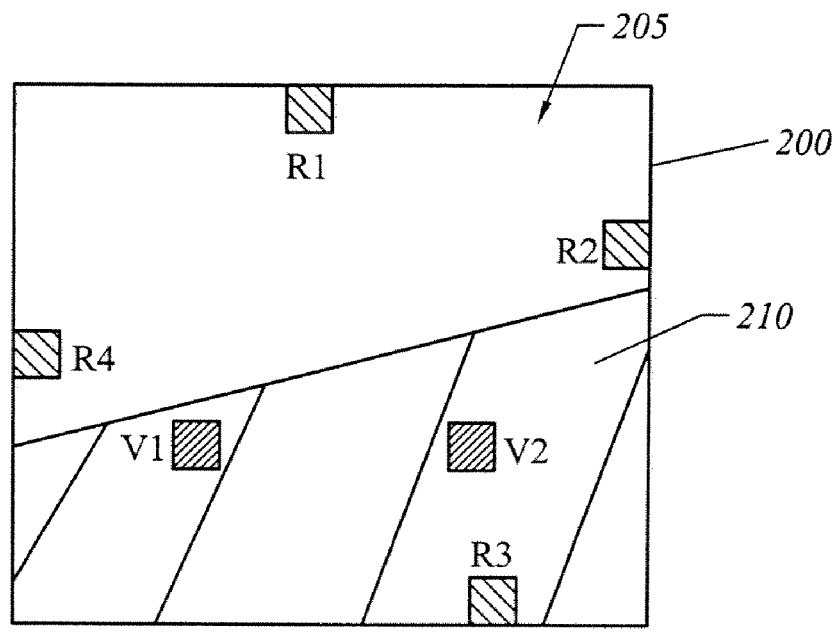
FIG. 3 illustrates coverage of a primitive over a real sample and two virtual samples in accordance with one embodiment of the present invention.

FIGS. 2 and 3 illustrate some aspects of virtual samples. Referring to FIG. 2, a simplified representation of a pixel 200 is illustrated. Four real samples R1, R2, R3, and R4 are illustrated. Each real sample may include, for example, color component data (i.e., the color of the primitive at the sample location) and other data, such as z depth data (which may, for example, be used to determine whether a primitive is a topmost primitive). In this example, the top portion of pixel 200 is covered by a first primitive 205 whereas a bottom portion of the pixel is covered by a second primitive 210. Note that first primitive 205 covers three real samples R1, R2, and R4 whereas second primitive 210 covers real sample R3. In this example, if each real sample were weighted equally in an anti-aliasing blending process (e.g., 25% for the color value of each real sample), then real sample R3 would contribute only 25% to the final color value even though second primitive 210 covers greater than 25% of the area of pixel 200. Conventionally, additional real samples within the interior of pixel 200 would be required to improve the weighting but each real sample would require calculating, storing, and transporting real sample values, such as color component and z depth data.

FIG. 3 illustrates the same pixel as in FIG. 2 but with the addition of virtual samples V1 and V2. In accordance with one embodiment of the present invention, each virtual sample corresponds to a location within a pixel and a pointer identifying the real samples that are covered by the same primitive that covers the virtual sample. In this example, the virtual samples, V1 and V2, and real sample R3 are covered by second primitive 210. As a result the pointer for the virtual samples, V1 and V2, point to real sample R3.

The identity of virtual samples that are owned by a real sample provides additional information that can be used to adjust the weight given to R3 in a blending process in light of the additional coverage information provided by the virtual samples. For example, if virtual sample locations are distributed within a pixel then the number of virtual samples owned by a real sample will approximately scale with the primitive coverage. Thus, for example, in the case illustrated in FIG. 3 the number of virtual samples owned by real sample R3 may be used to assign a weight to real sample R3 that more closely corresponds to the actual coverage percentage of second primitive 210 within pixel 200. However, since each virtual sample need only contain a pointer to a real sample, the memory and bandwidth requirements for virtual samples is much lower than if additional conventional real samples were taken in the interior of pixel 200.

Figure 4:
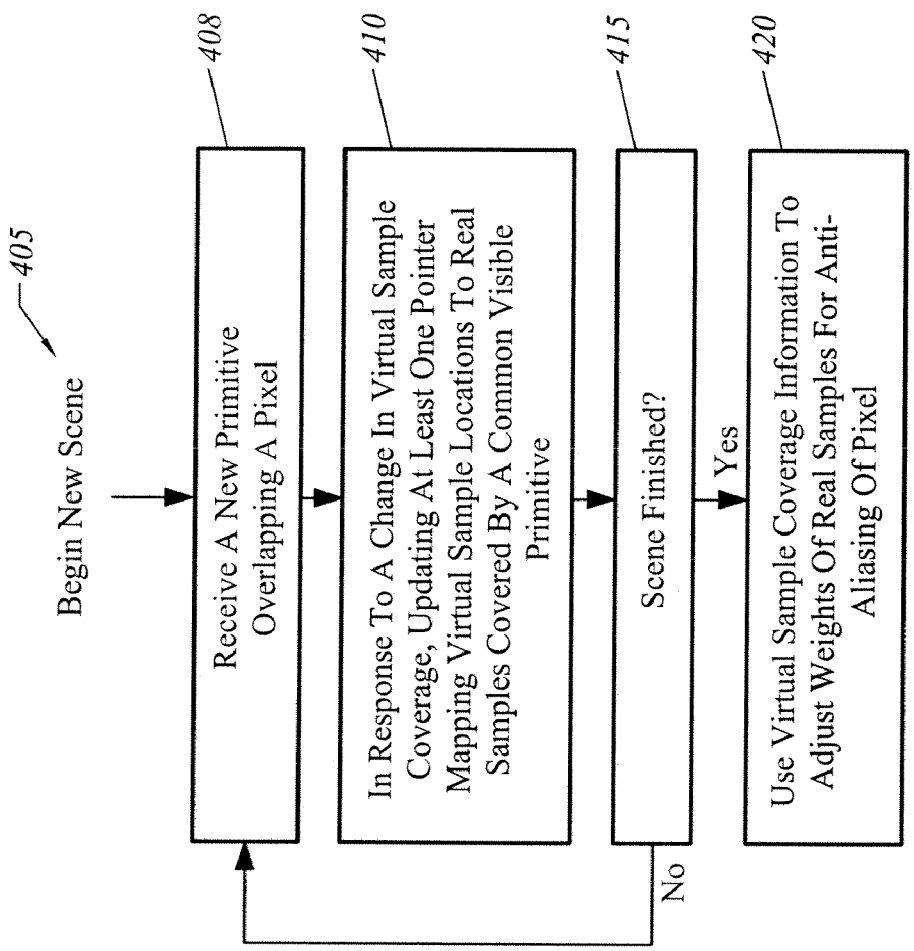
FIG. 4 illustrates a method of using virtual samples to adjust weights of real samples in an anti-aliasing process in accordance with one embodiment of the present invention.

FIG. 4 is a flow chart illustrating a method in accordance with one embodiment of the present invention. A new scene begins 405. As the scene is rasterized, new primitives of the scene are received 408 for a particular pixel. The visible primitives covering the virtual samples may therefore change. For example, a new primitive may arrive that covers a previously empty portion of the primitive or which may land on top of previously received primitives. In response to a change in virtual sample coverage, at least one pointer mapping virtual sample locations to real samples covered by a common visible primitive is updated 410. The process of receiving new primitives and updating pointers continues until the scene is finished 415, resulting in a final set of pointers that identifies the real samples that own each virtual sample. The virtual sample coverage information is used to adjust 420 the weight of real samples used to anti-alias the pixel.

Figure 5:
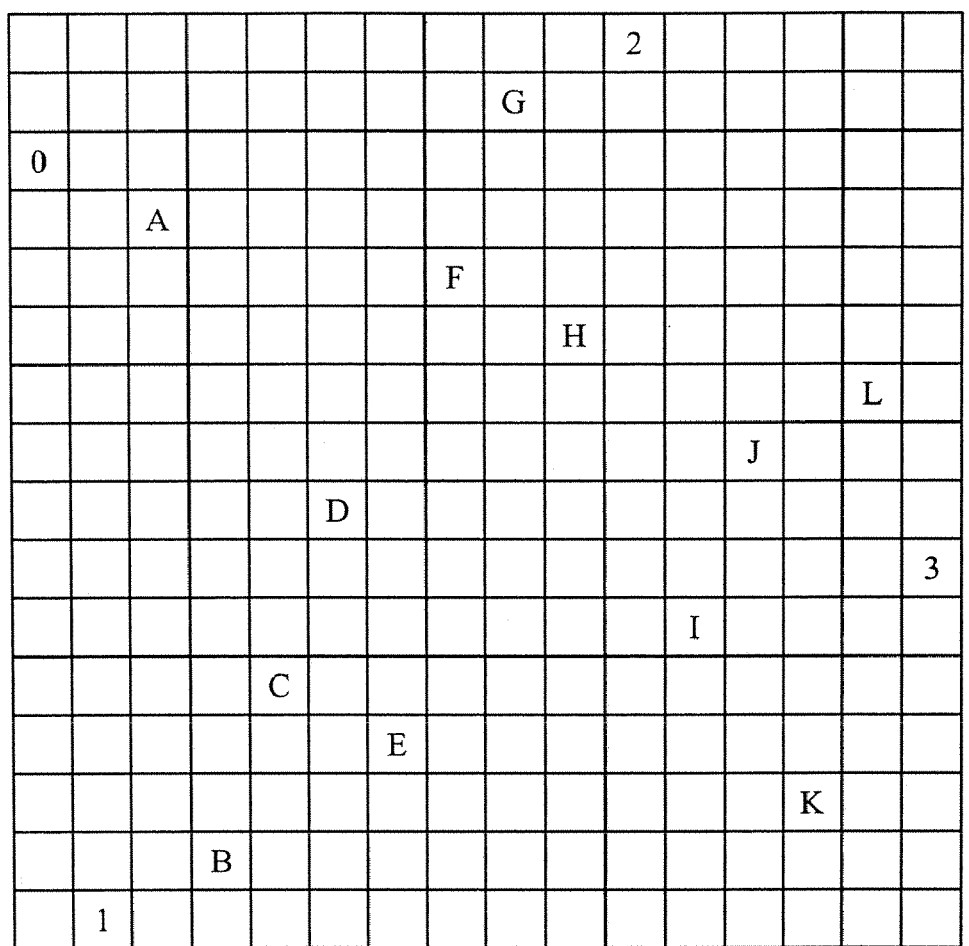
FIG. 5 illustrates an arrangement of real samples and virtual samples in a 16×16 pixel grid in accordance with one embodiment of the present invention.

FIG. 5 illustrates an exemplary arrangement of locations of real and virtual samples within a single pixel 500 that is to be anti-aliased with a quality comparable to 16× sampling. The number of real samples to be calculated per pixel is selected and the locations of the real samples selected. For example, in one embodiment an arrangement having at least two real samples per pixel are selected, such as a 4× rotated multisampling pattern in which 4 real samples are generated for each pixel. Similarly, the number of virtual samples to be calculated per pixel is selected and the location of the virtual samples selected. The number of virtual samples is selected to provide additional information on how primitives cover the pixel ("virtual coverage information"). Empirical studies or computer modeling may be performed to optimize the arrangement of real and virtual samples for particular types of graphics applications. In one embodiment the same arrangement of real and virtual samples is used on all pixels that are anti-aliased. However, it is contemplated that in some applications the arrangement of real and virtual samples could be dynamically adjusted based upon the type of graphics application being executed should, for example, two different types of graphics applications have different sub-pixel attributes.

Pixel 500 is divided into a 16×16 uniform grid corresponding to 16× sampling with the number of real and virtual samples selected to total up to sixteen. A pre-selected number of real sample locations, such as real samples 0, 1, 2, and 3, are arranged on the 16×16 grid. For each real sample location a conventional real sampling technique may be used to calculate a full set of conventional sample attributes, such as color component values, z depth values, or other sample attributes. In one embodiment there are twelve virtual samples, A, B, C, D, E, F, G H, I, J, K, and L arranged on the same 16×16 uniform grid as real sample locations 0, 1, 2, and 3. In the example illustrated in FIG. 5, the real samples are located near the borders of the 16×16 uniform grid, since this maximizes virtual sample coverage.

Since each virtual sample is a pointer, it requires much less data than a conventional real sample. As an illustrative example, in one embodiment each real sample is at least 32 bits, and may contain, for example, a 32 bit z depth or stencil value, and a 32 to 128 bit color component value. Each virtual sample requires only sufficient bits to point to all the real samples in a pixel that own it, which, as described below, in some embodiments requires only 1 bit per real sample (e.g., four bits, assuming 4 real samples). Thus, the memory storage and bandwidth requirements for virtual samples are only a small fraction of that of real sample.

In one embodiment a bitcode is used to assign ownership of a virtual sample to one or more real samples. For example, in an embodiment in which there are 12 virtual samples and 4 real samples, each real sample may have a preselected bit code (e.g., bit codes 0001, 0010, 0100, and 1000). Thus, a virtual sample owned by a single real sample may be assigned the same bit code as the real sample.

Virtual samples owned by more than one real sample are indicated by a bit code indicating the set of real samples that own the virtual sample. For example, the virtual sample bit code may have one bit location in the bit code to represent each real sample that owns the virtual sample. For example, a four-bit bitcode has one bit position for each of four real samples. The set of real samples that own a virtual sample can thus be identified by bit positions having a value of "1" (e.g., a bit code of 0001 indicates that the virtual sample is owned by a real sample assigned the first bit position but is not owned by any of the other real samples whereas a bit code of 1001 indicates that the virtual sample is owned by both the real sample assigned the first bit position and by the real sample assigned the fourth bit position).

In one embodiment, a logical OR operation is performed on the bit code of each real sample that owns a virtual sample to generate a bitcode that identifies the set of real samples that owns the virtual sample. For example, a virtual sample that is covered by the same primitive which covers real samples 0001 and 1000 would have, after a logical OR operation on 0001 and 1000, a bitcode of 1001.

The set of bitcodes for all of the virtual samples of one or more pixels forms a virtual coverage buffer. As a new primitive is received the virtual coverage buffer is updated to reflect any changes in ownership of the virtual samples. The virtual coverage buffer may, for example, be stored in a portion of AA buffer 155 or other memory location.

FIGS. 6-11 illustrate examples of coverage buffer updates made after one or more new primitives are received. Prior to rendering a new scene, an initial default clear operation may be performed to clear the virtual coverage buffer. As new primitives are received, the ownership of virtual samples by real samples of visible pixels is resolved and the virtual sample bit codes of the virtual coverage buffer are adjusted to account for changes in coverage of visible primitives.

Figure 6:
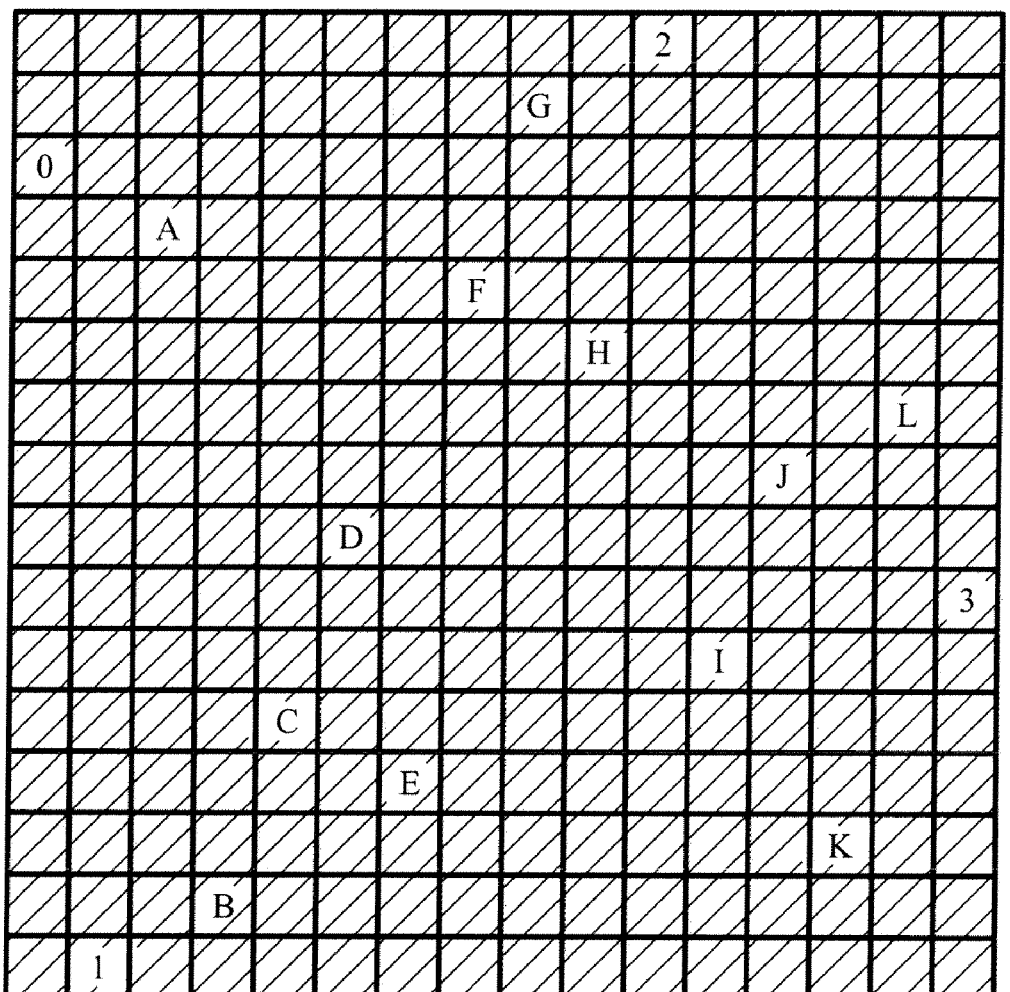
FIG. 6 illustrates an example in which the pixel grid of FIG. 5 is completely covered by a primitive.

In the example of FIG. 6, it is assumed that one primitive covers the entire pixel grid of pixel 500, as indicated by the uniform shading of the entire 16×16 grid. For this case, all of the virtual pixels are assigned a default value (e.g., 1111), as indicated in Table 2, indicating that each virtual sample is owned by all four real samples. In one embodiment, the default 1111 value is also assigned to all virtual samples at the beginning of each scene as part of a clear step, such as a z depth buffer clear step performed prior to a new scene.

TABLE 2

Exemplary virtual sample bit codes for the case that one primitive covers virtual samples A to L.

| | |
|---|---|
| A | 1111 |
| B | 1111 |
| C | 1111 |
| D | 1111 |
| E | 1111 |
| F | 1111 |
| G | 1111 |
| H | 1111 |
| I | 1111 |
| J | 1111 |
| K | 1111 |
| L | 1111 |

Figure 7:
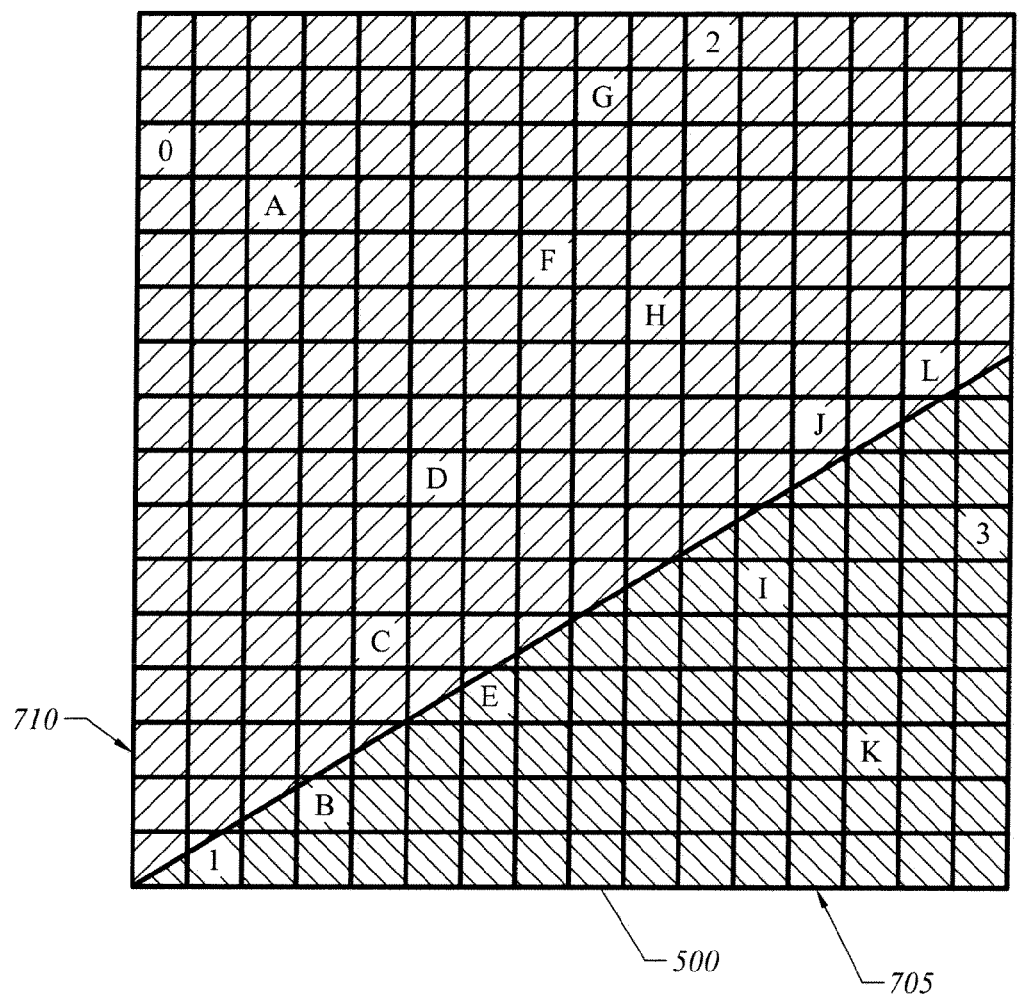
FIG. 7 illustrates an example in which a new primitive covers a portion of the pixel grid of FIG. 6.

FIG. 7 illustrates an example where a new primitive 705 is drawn that partially covers the pixel 500. Primitive regions 705 and 710 correspond to visible (top-most regions closest to the eyepoint of a viewer) primitive regions on pixel 500. Primitive regions 705 and 710 have different color component values. As a result, the ownership of the virtual samples is reassigned. Primitive 710 includes real samples 0 and 2. New primitive 705 includes real samples 1 and 3. In this example, real sample 0 has a bit code of 0001, real sample 1 has a bit code of 0010, real sample 2 has a bit code of 0100, and real sample 3 has a bit code of 1000. The logical OR operation on real samples 1 and 3 has a bit code of 1010. The logical OR operation on real samples 0 and 2 has a bit code of 0101. Thus, all of the virtual samples owned by real samples 0 and 2 associated with primitive 710 are assigned a bit code of 0101. Additionally, all of the virtual samples owned by real samples 1 and 3 associated with primitive 705 are assigned a bit code of 1010. This is summarized in Table 3.

TABLE 3

Exemplary virtual sample bit codes for the example of FIG. 7.

| | |
|---|---|
| A | 0101 |
| B | 1010 |
| C | 0101 |
| D | 0101 |
| E | 1010 |
| F | 0101 |
| G | 0101 |
| H | 0101 |
| I | 1010 |
| J | 0101 |
| K | 1010 |
| L | 0101 |

Figure 8:
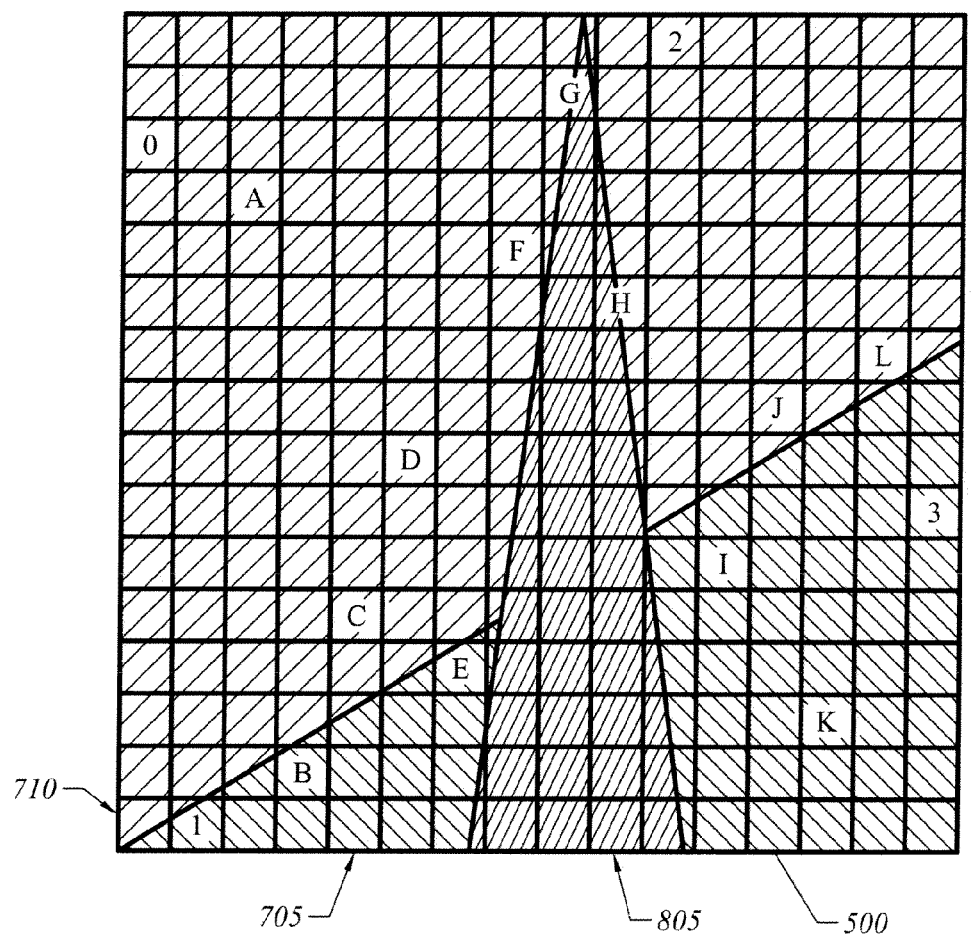
FIG. 8 illustrates an example in which a new sliver triangle is received which is on top of the primitives of FIG. 7.

FIG. 8 illustrates an example where a new primitive 805 is a sliver triangle 805 that does not cover any real samples. Sliver triangle 805 is on top of primitives 710 and 705. In this case, since the new primitive 805 does not cover any real samples, no coverage information is recorded, i.e., the sliver triangle 805 is skipped in regards to further anti-aliasing processing. Consequently, the bit codes will not change from the previous example in Table 3. In an alternate embodiment, the virtual samples covered by the sliver may be orphaned, using an orphan algorithm that is described below in more detail. The case of sliver triangles illustrates the tradeoff between the number of real samples and anti-aliasing quality. While the virtual samples improve the weighting of the real samples, there are instances, such as sliver triangles, where the virtual samples do not result in exactly the same anti-aliasing quality as if all of the virtual sample were replaced with additional real samples as in conventional 16× multisampling.

Figure 9:
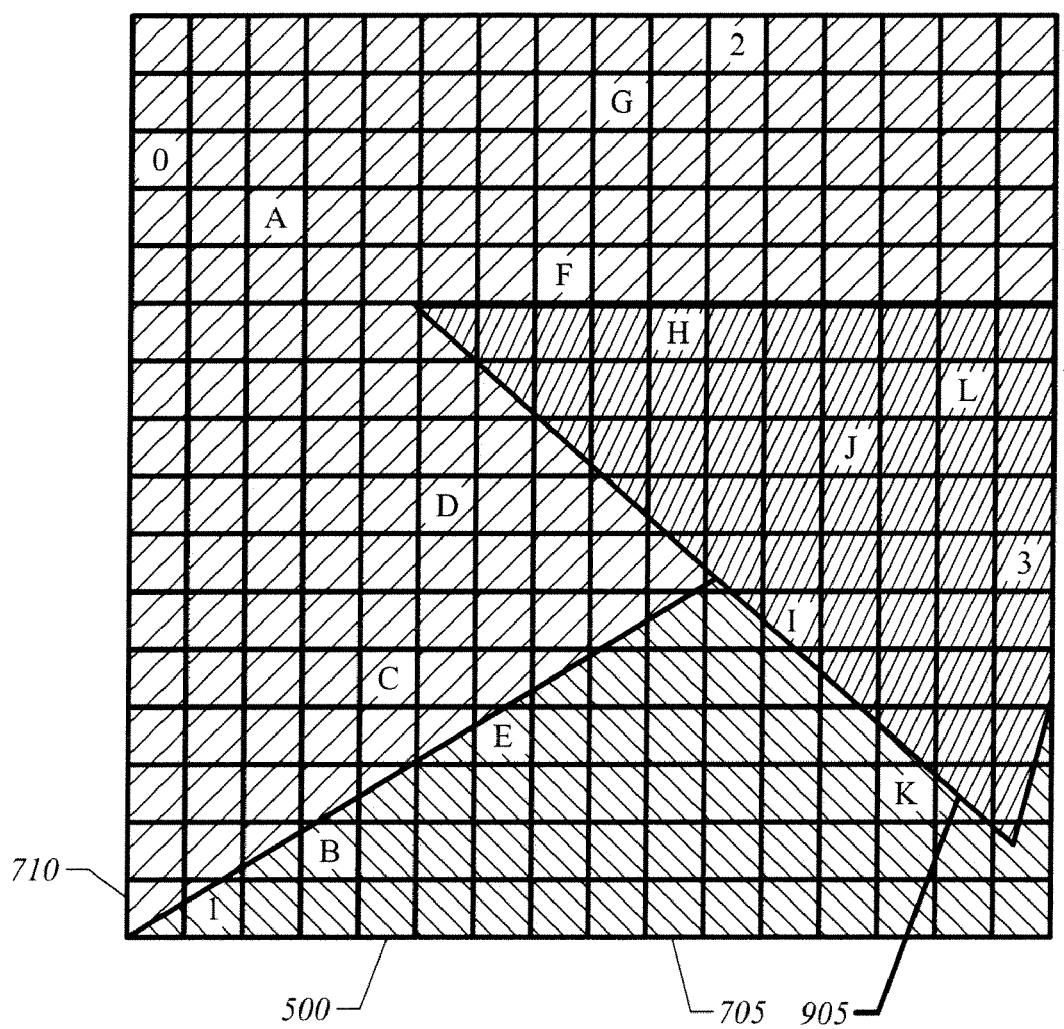
FIG. 9 illustrates an example in which a new triangle is received which is on top of the primitives of FIG. 7.

FIG. 9 illustrates the case where a new primitive 905 is on top of the two previously rasterized primitive 705 and 710, i.e., new triangle 905 is closer to the eyepoint and occludes underlying regions of primitives 705 and 710. As a result, virtual samples B, E, and K are now owned by the single real sample 1. Virtual samples H, I, J, and L are owned by the single real sample 3. Virtual samples A, C, D, F, and G are owned by real samples 0 and 2. This is illustrated in Table 4.

TABLE 4

Exemplary virtual sample bit codes for the example of FIG. 9.

| | |
|---|---|
| A | 0101 |
| B | 0010 |
| C | 0101 |
| D | 0101 |
| E | 0010 |
| F | 0101 |
| G | 0101 |
| H | 1000 |
| I | 1000 |
| J | 1000 |
| K | 0010 |
| L | 1000 |

Figure 10:
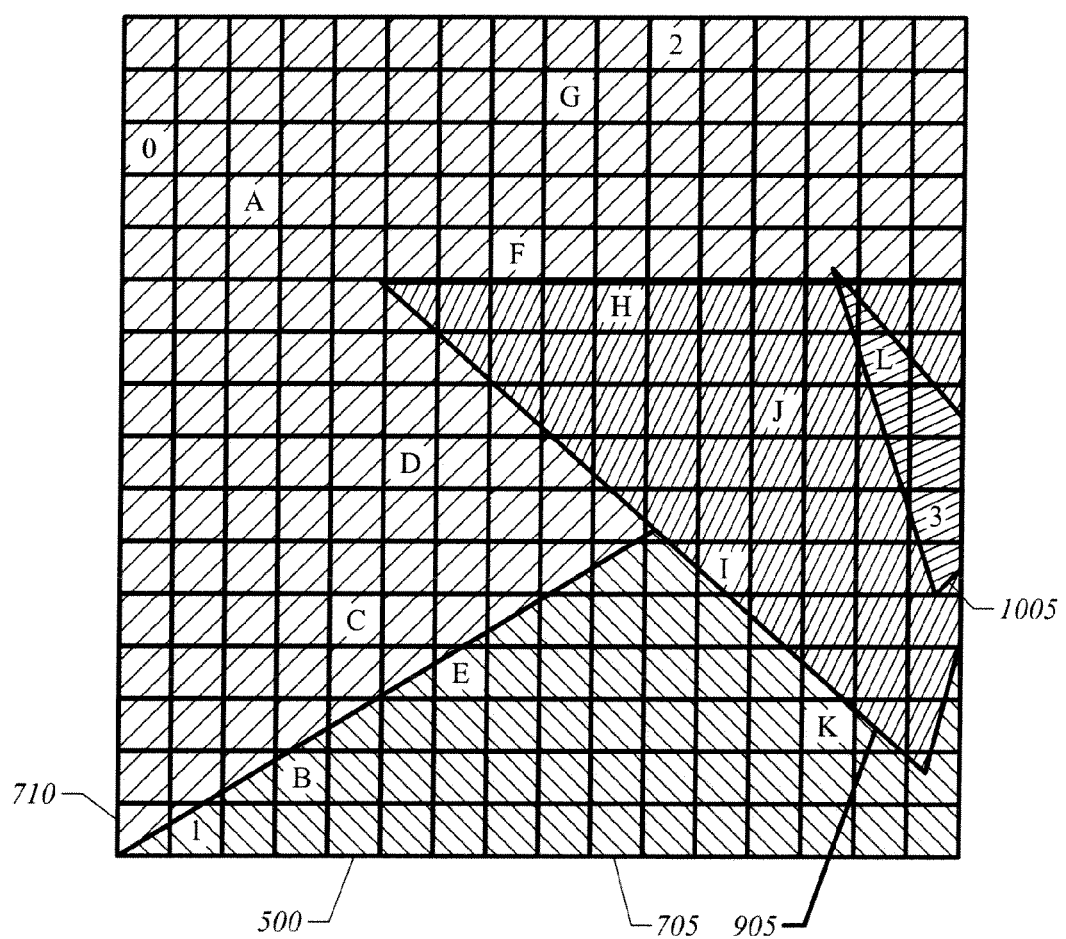
FIG. 10 illustrates an example in which a new triangle is received which generates orphaned virtual samples.

As new primitives are rendered, the situation may arise that a new primitive is drawn on top of a real sample such that virtual samples which previously were owned by a visible real sample become orphaned. This case is illustrated in FIG. 10. In the example of FIG. 10, a new triangle 1005 is on top of a previously received triangle 905. As a result new triangle covers real sample 3 and also covers virtual sample L. Virtual samples I, H, and J associated with triangle 905 are now orphaned in that they are not owned by any visible real samples.

A rule is required to deal with orphaned virtual samples. For example, while the virtual sample bit code could be set to zero (to indicate no coverage) for orphaned samples, this might result in a later anti-aliasing operation overweighting one or more of the real samples. In one embodiment, each orphaned virtual sampled has its virtual sample bit code set to be that of the closest real sample within the pixel. For example, orphaned-virtual sample H is closest to real sample 2. Consequently, orphaned virtual sample H may be assigned the bit code of real sample 2. Conversely, orphaned real samples I and J are closest to real sample 3 and are assigned the bit code of real sample 3. Table 5 summarizes the bit codes for the virtual samples after the orphaned samples are assigned to the closest real samples.

TABLE 5

Exemplary virtual sample bit codes after orphaned sample reassignment.

| | |
|---|---|
| A | 0101 |
| B | 0010 |
| C | 0101 |
| D | 0101 |
| E | 0010 |
| F | 0101 |
| G | 0101 |
| H | 0100 |
| I | 1000 |
| J | 1000 |
| K | 0010 |
| L | 1000 |

Figure 11:
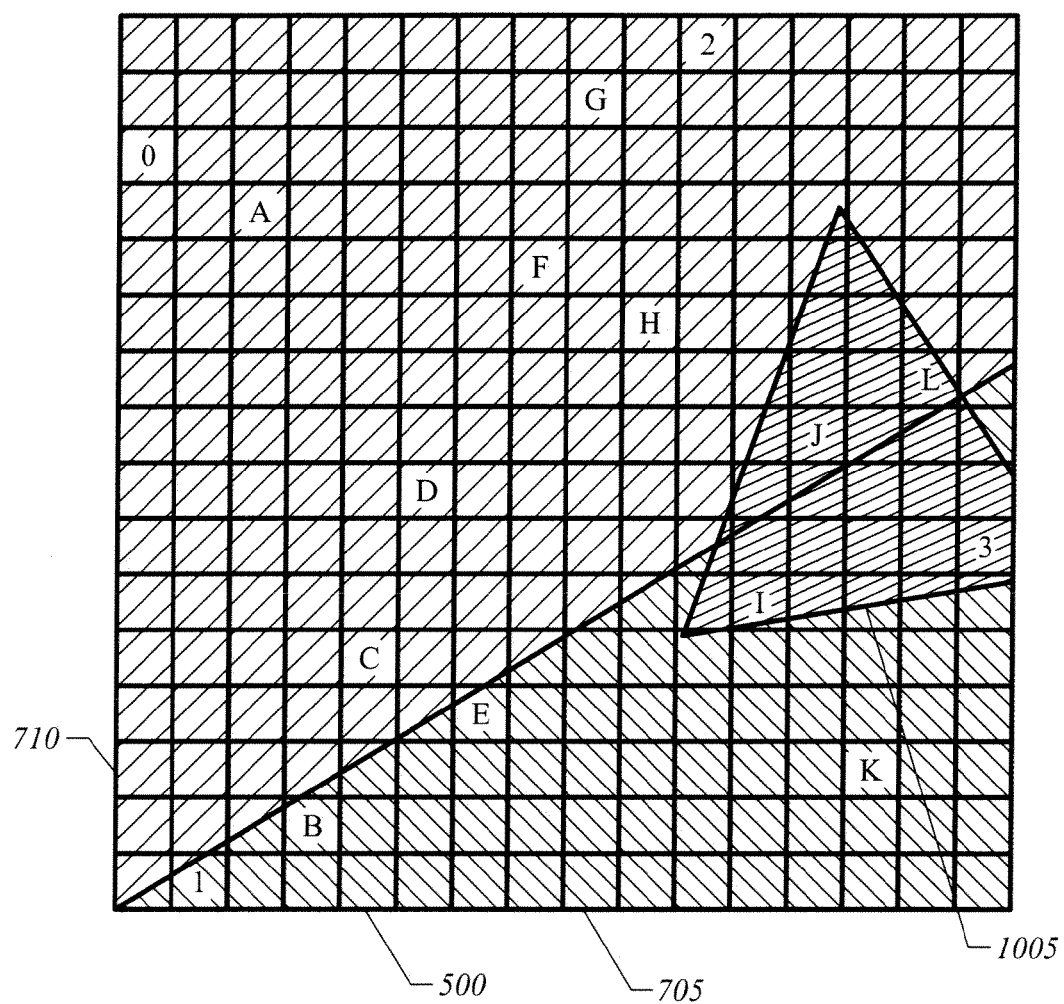
FIG. 11 illustrates an effective coverage for the example of FIG. 10 after an exemplary ownership of orphaned virtual samples is resolved by assigning the ownership of orphaned virtual samples to nearest real samples.

FIG. 11 illustrates the effective areas of primitives 705, 710, and 1005 after the orphans of FIG. 10 are reassigned to the nearest real sample. Note that the areas of primitives 705, 710, and 1005 have changed, with primitive 1005 changing significantly in size. The result illustrated in FIG. 11 reflects a tradeoff to avoid overly biasing the reassignment of orphaned primitives to any one primitive Note that increasing the number of real samples will tend to reduce the frequency with which orphaned samples are generated, all else being equal.

Figure 12:
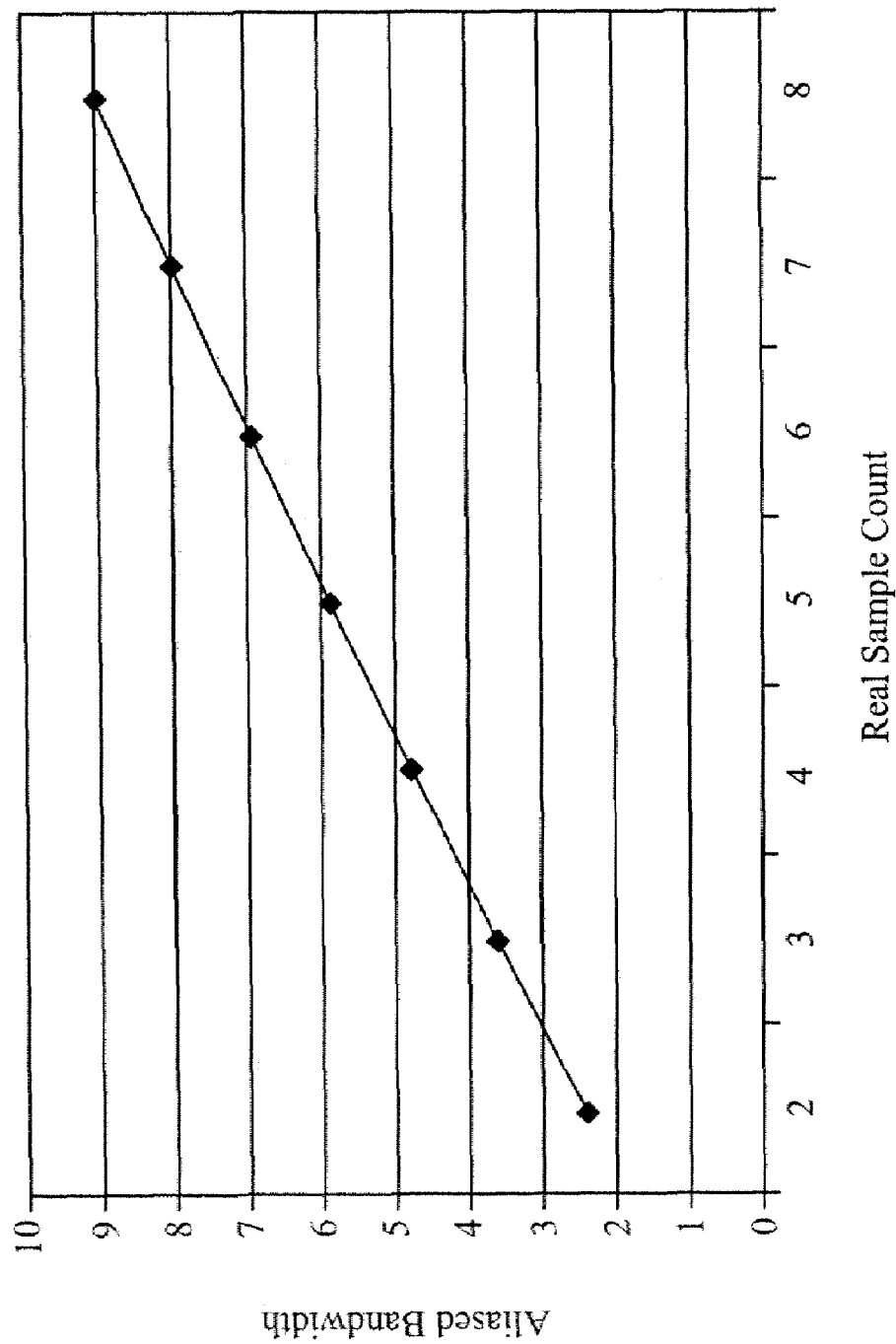
FIG. 12 illustrates a tradeoff between aliased bandwidth and real sample count for 16× anti-aliasing.

As can be understood from the previous discussion of sliver triangles and orphaned virtual samples, the anti-aliasing quality tends to scale with the number of real samples used per pixel. The anti-aliasing quality also depends upon the types of graphical objects being rendered with, for example, lines being likely to require more real samples than polygons to achieve comparable AA quality. In one embodiment, graphics system 100 has a plurality of modes that tradeoff memory space and bandwidth for anti-aliasing quality. It is contemplated that the modes could be set either statically (e.g., for an entire graphics program) or dynamically, using an API, depending upon the desired level of AA quality and the type of graphics scenes to be rendered. For example, in a 16× anti-aliasing system, the number of real samples could be selected to be 2, 3, 4, 5, 6, 7 or 8 real samples with the rest of the 16 samples being virtual samples. For example, in one embodiment, the quality settings for 16×AA vary from 2, 4, 6 or 8 real samples, and 14, 12, 10 and 8 virtual samples respectively. For 16× coverage quality, the equation for bytes of bandwidth and storage is:

$64R+(16-R)R=80R-R^2$, where R is the number of real samples per pixel. FIG. 12 illustrates a plot of the corresponding tradeoff between aliased bandwidth and real sample count.

In one embodiment, data storage requirements for virtual samples are reduced by including an algorithm to make certain ownership bit patterns invalid. Quality loss can be avoided by carefully choosing these invalid patterns such that the probability of any pattern occurring is minimized. Conceptually, this is performed by drawing a circle of influence around every real sample. If a virtual sample is located within a real sample's circle, then the real sample is a legal owner of that virtual sample. If not, then the real sample is not a valid owner, and its ownership mask is always considered to be 0. When writing data to the coverage buffer these forced zeros are skipped; when reading, they are added. This allows a 4+12 virtual coverage AA mode to be stored in 32-bits, rather than the typical 48. The rules applied to limit virtual coverage bit patterns will depend upon the number of real samples and their distribution in a pixel. For 4+12 "X" virtual coverage anti-aliasing the convex hull of the 4 real samples is a quadrilateral with vertices at the real samples. In one implementation the 4 virtual samples near the pixel center are allowed to reference all 4 real samples, while the 8 remaining virtual samples may only reference 2 real samples. These specifics are different for alternate sample patterns (for example, 4+12 "Y" modes, where the convex hull is a triangle, with the fourth real sample located at approximately the centroid).

As previously described, the virtual samples provide additional information on pixel coverage and may be used to adjust a weight given to real samples in anti-aliasing. For example, since a virtual sample is assumed to have the same color as the real samples that own it, in one embodiment the number of sample counts for a particular color can be increased by the number of corresponding virtual sample counts and then be scaled by the total number of real and virtual samples. However, more generally, an arbitrary weighting function may be used for weighting real samples as a function of the virtual samples that they own.

It is desirable to reduce the computational effort required to calculate real sample weights during a down-sampling process to resolve an anti-aliasing buffer. Since a virtual sample can point to more than one real sample it is desirable to utilize a weighting algorithm that avoids unnecessary renormalization calculations. In one embodiment a virtual sample contributes to the weighting only of the closest real sample to which it points (e.g., the closest real sample with a 1 in a bitmask). An exemplary weighting algorithm for determining weights from the coverage buffer bitmask during a down-sampling process is as follows:

for each real sample r
weight[r] = 1;// contribution of real sample itself for each virtual sample
determine closest real sample r with a 1 in the bitmask
weight[r]++.

A table may be used to determine, for each virtual sample and coverage bit pattern, which eligible real sample is the closest.

The final pixel color is calculated during anti-aliasing using the weights calculated for the real samples. An exemplary algorithm for computing the final pixel color as a weighted average of the real sample colors (color[r]) is as follows finalcolor = 0;
for each real sample r
finalcolor += color[r]* weight[r]/ (total samples).

In one embodiment, graphics system 100 automatically falls back into a conventional anti-aliasing mode utilizing only the real samples when the coverage information alone for the virtual samples is insufficient. This guarantees a minimum AA quality, for any type of rendering. By way of comparison, some A-buffer and fragment AA techniques have failure modes that introduce artifacts which aren't present in normal multisampling (e.g., bleed-through A-buffer merge artifacts), or drop AA quality to effectively zero, such as during stencil buffer rendering. By gracefully dropping back to 4× rotated multisampling (or, more accurately, the number of real samples) in cases where coverage information alone is insufficient (stencil rendering is the most notable example), the algorithm of the present invention provides a graceful failure mode.

In one embodiment, during a down-sampling process to resolve the AA buffer 155, each virtual sample's weight is summed up by finding the highest priority bit set where priority is defined by proximity to the real samples. Searching the bits in priority order facilitates a graceful fallback to 4× rotated AA, in cases where the virtual coverage buffer may not contain enough information (e.g., stencil-only rendering, alpha blending).

An exemplary pseudocode algorithm to update virtual samples while rendering is the following:

for each virtual sample {
if this virtual sample was NOT touched {
    clear all bits that correspond to the real samples touched
    if all bits are now zero in this virtual sample
        set one bit that corresponds to the nearest real sample
}
else { // this virtual sample was touched
    set all bits that correspond to the real samples touched clear all bits that correspond to the real samples NOT
touched
}
assert (at least 1 bit is set in this virtual sample)
}

Note that the check for valid owners (the assertion in the last line) can be performed either during an update or during a downfilter. The two operations are equivalent, and the results identical.

The present invention provides a number of benefits. As previously described, each virtual sample requires less data than a real sample. Consequently, high quality AA may be achieved for a particular number of real and virtual samples with reduced data storage and bandwidth requirements compared with sampling with the same total number of real samples. Additionally, it is highly scalable, order independent, compatible with a low-cost hardware implementation, does not suffer from bleed-through, is compatible with different color and depth buffer formats, and has a graceful failure mode in which it falls back to a minimum AA quality.

While one embodiment of the present invention includes a plurality of real samples and virtual samples locations within each individual pixel, it will be understood that other arrangements are also contemplated. For example, in an alternate embodiment there is one real sample per pixel and one virtual sample. For example, each pixel may share one virtual sample with each of its four neighbors. Thus in this embodiment a pixel has one real sample and four virtual samples arranged along its four edges. In this example the downfiltering would be a weighting of the one real sample and the real samples of neighboring pixels.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of generating weighted samples for anti-aliasing a pixel, comprising:
generating a sequence of graphical primitives for a scene;
selecting a number of real samples per pixel and a number of virtual samples per pixel using an Application Programming Interface (API) in response to an attribute associated with the scene;
generating at least one real sample for a primitive covering the pixel, the real sample including z depth data and color data for a sample location within the pixel;
detecting coverage of at least one virtual sample location by said primitives within the pixel;
for each covered virtual sample location within the pixel, forming a virtual sample by generating a pointer identifying a set of real sample locations within the pixel that are also covered by a common visible primitive;
utilizing said at least one virtual sample to adjust the weight of at least one real sample for anti-aliasing; and
displaying the anti-aliased pixel.

2. The method of claim 1, wherein said virtual sample is a pointer that has no color component data and no z depth data.

3. The method of claim 1, wherein said detecting coverage comprises:
receiving a new primitive for said scene; and
determining changes in coverage of said pixel.

4. The method of claim 3, wherein said forming a virtual sample comprises:
detecting a change in coverage of at least one virtual sample location associated with said new primitive; and
updating a virtual coverage buffer to indicate a new set of real samples associated with said at least one virtual sample location.

5. The method of claim 4, wherein said detecting and updating is continued for each new primitive until said scene is finished.

6. The method of claim 1, wherein each virtual sample comprises a bitcode to indicate which real samples within said pixel own the virtual sample.

7. The method of claim 1, wherein said anti-aliasing process is a multi-sampling process.

8. The method of claim 1, wherein said anti-aliasing process is a supersampling process.

9. A method of generating weighted samples for anti-aliasing a pixel, comprising:
selecting a number of real samples per pixel and a number of virtual samples per pixel using an Application Programming Interface (API) in response to an attribute associated with a scene;
determining coverage of a sequence of primitives generated for the scene on real sample locations and virtual sample locations;
for each real sample location, generating a real sample having at least color component information and z depth information;
for each virtual sample location, generating a virtual sample that is a pointer identifying a set of real samples which are covered by a common primitive but with each virtual sample having no independent color component information and z-depth information;
utilizing coverage information for at least one of said virtual sample locations to adjust the weight of at least one of said real samples; and
displaying the anti-aliased pixel.

10. The method of claim 9, wherein each a virtual sample is generated for each said virtual sample location that is covered corresponding to a bitcode identifying said set of real samples.

11. The method of claim 9, wherein said anti-aliasing process is a multi-sampling process.

12. The method of claim 9, wherein said anti-aliasing process is a supersampling process.

13. A method of generating weighted samples for anti-aliasing a pixel, comprising:
selecting a number of real samples per pixel and a number of virtual samples per pixel using an Application Programming Interface (API) in response to an attribute associated with a scene;
determining coverage by primitives over virtual sample locations and real sample locations; and
for each real sample location, generating a real sample having at least color component data at the real sample location;

for each virtual sample location that is covered by a primitive, generating a virtual sample that is a pointer to real sample locations covered by a common primitive;

utilizing virtual sample coverage information to adjust the weights of real samples to perform anti-aliasing; and displaying the anti-aliased pixel.

14. A graphics system generating weighted samples for anti-aliasing pixels, comprising:

a graphics processing unit (GPU) configured to have a mode of operation in which it selects a number of real samples per pixel and a number of virtual samples per pixel using an Application Programming Interface (API) in response to an attribute associated with a scene and determines coverage by primitives over virtual sample locations and real sample locations, the GPU generating a real sample having color data and z depth data for each real sample location and generating a virtual sample at each virtual sample location with each virtual sample being a pointer identifying corresponding real sample locations covered by a common primitive, said GPU utilizing virtual sample coverage information to adjust the weights of real samples.

* * * * *